(12) United States Patent
Chen et al.

(10) Patent No.: US 11,381,173 B2
(45) Date of Patent: Jul. 5, 2022

(54) SWITCHING REGULATOR AND CONTROL CIRCUIT THEREOF AND QUICK RESPONSE METHOD

(71) Applicant: Richtek Technology Corporation, Zhubei (TW)

(72) Inventors: Yung-Jen Chen, Kaohsiung (TW); Yu-Chieh Lin, Keelung (TW); Chia-Chi Liu, Kaohsiung (TW); Fu-To Lin, Tainan (TW)

(73) Assignee: RICHTEK TECHNOLOGY CORPORATION, Zhubei (TW)

( * ) Notice: Subject to any disclaimer, the term of this patent is extended or adjusted under 35 U.S.C. 154(b) by 19 days.

(21) Appl. No.: 17/145,402

(22) Filed: Jan. 11, 2021

(65) Prior Publication Data
US 2021/0296989 A1 Sep. 23, 2021

(30) Foreign Application Priority Data
Mar. 23, 2020 (TW) .................................. 109109697

(51) Int. Cl.
| | |
|---|---|
| H02M 3/158 | (2006.01) |
| H02M 1/08 | (2006.01) |
| G05F 1/575 | (2006.01) |
| G05F 1/565 | (2006.01) |
| H02M 1/00 | (2006.01) |
| H02M 3/156 | (2006.01) |

(52) U.S. Cl.
CPC .......... *H02M 3/1584* (2013.01); *G05F 1/565* (2013.01); *G05F 1/575* (2013.01); *H02M 1/08* (2013.01); *H02M 1/0009* (2021.05); *H02M 3/1566* (2021.05); *H02M 3/1586* (2021.05)

(58) Field of Classification Search
CPC .......... G05F 1/565; G05F 1/575; H02M 1/08; H02M 1/0009; H02M 3/1566; H02M 3/1584; H02M 3/1586
See application file for complete search history.

(56) References Cited

U.S. PATENT DOCUMENTS

| | | | | |
|---|---|---|---|---|
| 2016/0126840 | A1* | 5/2016 | Kelly | H02M 3/157 323/271 |
| 2018/0152099 | A1* | 5/2018 | Savic | H02M 3/156 |
| 2021/0384830 | A1* | 12/2021 | Bertolini | H02M 3/157 |

* cited by examiner

*Primary Examiner* — Adolf D Berhane
*Assistant Examiner* — Lakaisha Jackson
(74) *Attorney, Agent, or Firm* — Tung & Associates

(57) ABSTRACT

A switching regulator which has load transient quick response ability includes at least one power stage circuit and a control circuit. The control circuit includes a pulse width modulation (PWM) signal generation circuit and a quick response (QR) signal generation circuit. The PWM signal generation circuit generates a PWM signal according to an output voltage and a QR signal, to control a power switch of the corresponding power stage circuit, thus converting an input voltage to the output voltage. The QR signal generation circuit includes a differentiator circuit and a comparison circuit. The differentiator circuit performs a differential operation on a voltage sensing signal related to the output voltage, to generate a differential signal. The comparison circuit compares the differential signal with a QR threshold signal, such that when the differential signal exceeds the QR signal, the PWM signal generation circuit performs a QR procedure.

30 Claims, 10 Drawing Sheets

SWITCHING REGULATOR AND CONTROL CIRCUIT THEREOF AND QUICK RESPONSE METHOD

CROSS REFERENCE

The present invention claims priority to TW 109109697 filed on Mar. 23, 2020.

BACKGROUND OF THE INVENTION

Field of Invention

The present invention relates to a switching regulator; particularly, it relates to such switching regulator having load transient quick response ability. The present invention also relates to a control circuit and a quick response (QR) method for use in such switching regulator.

Description of Related Art

Please refer to FIG. 1, which shows a schematic block diagram of a conventional switching regulator 1. The switching regulator 1 is configured to operably convert an input voltage Vin to an output voltage Vout, so as to supply power to a central processing unit (CPU) or a graphic processing unit (GPU) 10. As shown in FIG. 1A, the switching regulator 1 is a multi-phase switching regulator, which includes: plural power stage circuits 11 (i.e. plural phases) and a control circuit 12. The control circuit 12 is configured to operably generate pulse width modulation (PWM) signals PWM1, PWM2 and PWM3 according to a voltage sensing signal Vsense related to the output voltage Vout and current sensing signals CS1, CS2 and CS3 related to inductor currents flowing through corresponding power stage circuits 11, so as to respectively control corresponding power switches in the power stage circuits 11 to convert the input voltage Vin to the output voltage Vout.

Different from a switching regulator which is not adopted to supply power to a CPU or a GPU, the switching regulator 1 is required to fulfill the following specific needs: first, during operation of the CPU/GPU 10, the CPU/GPU 10 requires fast changing the supply power (changing the voltage and current levels), so the switching regulator 1 needs to fulfill dynamic voltage positioning (i.e., dynamically changing the output voltage to a requested level) with high precision. Second, the switching regulator 1 needs to be able to fulfill a certain load line requirement. Third, the switching regulator 1 needs to be able to swiftly transit between different power consumption statuses. Fourth, the switching regulator 1 needs to be able to execute various measurement and surveillance on various parameters. Typically, the switching regulator 1 communicates with the CPU/GPU 10 via a serial bus. The CPU/GPU 10 will give different power supply demands according to its loading conditions and different operation modes.

Generally, because a CPU/GPU 10 needs to consume a relatively large amount of current, in particular under certain operation modes, it is preferred for the switching regulator 1 to adopt a multi-phase structure, including plural power stage circuits 11. For example, the switching regulator 1 shown in FIG. 1A adopts a three-phase structure which includes three power stage circuits 11. The three power stage circuits 11 can respectively control a power switch or power switches therein according to PWM signals PWM1, PWM2 and PWM3, so as to convert the input voltage Vin to the output voltage Vout. It is imperative for the switching regulator 1 to precisely measure current in each phase. The control circuit 12 distributes the currents of three phases according to current sensing signals CS1, CS2 and CS3 each related to a current of a corresponding phase, to balance the currents. Besides, the control circuit 12 is capable of achieving good loop control, determining the load line, and enabling an over current protection procedure.

Please refer to FIG. 1B, which illustrates waveforms of a voltage sensing signal Vsense and PWM signals PWM1, PWM2 and PWM3 of the switching regulator 1 operating in a voltage-droop mode. In the voltage-droop mode, the output voltage Vout drops as the loading condition increases. As shown in FIG. 1B, following right after the time point t1, the output voltage Vout drops from the voltage level V1 to the voltage level V2, and when the output voltage Vout begins to drop from the voltage level V1, a voltage undershoot occurs. On the other hand, the output voltage Vout is elevated up as the loading condition decreases (not shown in FIG. 1B, referring to FIG. 3; e.g., the output voltage Vout is elevated up from the voltage level V2 to the voltage level V1), and when the output voltage Vout begins to be elevated up from the voltage level V2, a voltage overshoot occurs. Taking the above into consideration, by adopting load line control technique, the voltage-droop mode controls the switching regulator 1 operating to reduce the output voltage Vout when the load current increases and to elevate up the output voltage Vout when the load current decreases, such that the requirement for the output capacitor Cout is less strict, that is, it is not required for the switching regulator 1 to employ plural output capacitors Cout or to employ an output capacitor Cout having a high capacitance. Consequently, the circuit area as well as the manufacturing cost can be significantly reduced.

The prior art switching regulator 1 has the following drawbacks: first, when the load current increases, the voltage undershoot will occur at a beginning stage when the output voltage Vout starts dropping, but the prior art switching regulator 1 only relies on the feedback control according to the voltage sensing signal Vsense to deal with this situation; hence, the generated PWM signals PWM1, PWM2 and PWM3 during the duration from the time point t1 to the time point t2, as shown in FIG. 1B, have very intense pulses. This is poor load transient response, causing a more severe voltage undershoot of the output voltage Vout. Second, likely, at a beginning stage when the output voltage Vout is elevated up as the load current decreases, a more severe voltage overshoot will occur.

In other words, the prior art switching regulator 1 has a limited load transient response (i.e. slower load transient response time), in particular when the prior art switching regulator 1 operates under a constant ON time mode, the prior art switching regulator 1 can only deliver a limited amount of current during the ON time. Consequently and undesirably, the prior art switching regulator 1 is unable to timely respond to a heavy loading condition. Moreover, to evenly distribute the loading among the multiple phases, the prior art switching regulator 1 often operates under an interleaving mode wherein the phases are activated in turn, which further delays the response time; that is, power switches in different phases of the power stage circuits 11 are not turned ON at the same timing, so the power stage circuits 11 which are in an idle phase is unable to supply power to the load.

In view of the above, to overcome the drawbacks in the prior art, the present invention proposes a switching regulator having load transient quick response ability. The present invention also proposes a control circuit and a quick response (QR) method for use in such switching regulator.

SUMMARY OF THE INVENTION

From one perspective, the present invention provides a switching regulator, comprising: at least one power stage circuit, wherein each of the at least one power stage circuit is configured to operably control a power switch in the corresponding power stage circuit according to a pulse width modulation (PWM) signal, so as to convert an input voltage to an output voltage; and a control circuit including: a PWM signal generation circuit coupled to the at least one power stage circuit, the PWM signal generation circuit being configured to operably generate the PWM signal according to the output voltage and a quick response (QR) signal; and a QR signal generation circuit coupled to the PWM signal generation circuit, the QR signal generation circuit being configured to operably generate the QR signal according to the output voltage, wherein the QR signal generation circuit includes: a differentiator circuit, which is configured to operably perform a differential operation on a voltage sensing signal related to the output voltage, so as to generate a differential signal; and a comparison circuit coupled to the differentiator circuit, the comparison circuit being configured to operably compare the differential signal with a QR threshold signal, to generate the QR signal, wherein when the differential signal exceeds the QR threshold signal, the PWM signal generation circuit performs a QR procedure.

From another perspective, the present invention provides a control circuit for use in a switching regulator, wherein the control circuit is configured to operably convert an input voltage to an output voltage; the control circuit comprising: a PWM signal generation circuit coupled to at least one power stage circuit, the PWM signal generation circuit being configured to operably generate a PWM signal according to the output voltage and a quick response (QR) signal; and a QR signal generation circuit coupled to the PWM signal generation circuit, the QR signal generation circuit being configured to operably generate the QR signal according to the output voltage, wherein the QR signal generation circuit includes: a differentiator circuit, which is configured to operably perform a differential operation on a voltage sensing signal related to the output voltage, so as to generate a differential signal; and a comparison circuit coupled to the differentiator circuit, the comparison circuit being configured to operably compare the differential signal with a QR threshold signal, to generate the QR signal, wherein when the differential signal exceeds the QR threshold signal, the PWM signal generation circuit performs a QR procedure.

In one embodiment, the QR signal generation circuit further includes: a QR pulse generator coupled to the comparison circuit, the QR pulse generator being configured to operably generate a QR pulse signal according to the QR signal.

In one embodiment, the switching regulator comprises a plurality of power stage circuits and the PWM signal generation circuit correspondingly generates a plurality of PWM signals, and wherein in the QR procedure, the PWM signal generation circuit operably adjusts the PWM signals according to the QR signal, such that the power switches of the power stage circuits are ON concurrently for a QR period according to a QR pulse signal related to the QR signal.

In one embodiment, the QR threshold signal is determined according to an inductor current ripple signal, a capacitance of an output capacitor and/or a phase number of the at least one power stage circuit.

In one embodiment, the switching regulator operates under a constant ON time mode.

In one embodiment, the QR threshold signal includes: a positive QR threshold and/or a negative QR threshold.

In one embodiment, when the switching regulator operates under a voltage-droop mode, when the output voltage drops and the differential signal exceeds the QR threshold signal, the PWM signal generation circuit operably adjusts each PWM signal of the corresponding power stage circuit according to the QR signal, such that a corresponding upper gate power switch of each power stage circuit is ON concurrently for a QR period according to a QR pulse signal related to the QR signal.

In one embodiment, when the switching regulator operates under a voltage-droop mode, when the output voltage increases and the differential signal exceeds the QR threshold signal, the PWM signal generation circuit operably adjusts each PWM signal of the corresponding power stage circuit according to the QR signal, such that a corresponding lower gate power switch of each power stage circuit is ON concurrently for a QR period according to a QR pulse signal related to the QR signal or such that a corresponding upper gate power switch and the corresponding lower gate power switch of each power stage circuit are both OFF concurrently for the QR period according to the QR pulse signal related to the QR signal.

In one embodiment, the PWM signal generation circuit is configured to operably generate the PWM signal further according to a voltage identification signal, so as to regulate the output voltage according to the following equation: Vout=VDAC−Iout*RLL, wherein Vout denotes the output voltage, VDAC denotes a requested level which is related to the voltage identification signal, Iout denotes an output current and RLL denotes a resistance of a load line.

In one embodiment, the switching regulator operates under a voltage-droop mode, such that the PWM signal generation circuit operably generates the PWM signal according to the output voltage and the QR signal to convert the input voltage to the output voltage via a feedback loop.

From yet another perspective, the present invention provides a quick response (QR) method for use in a switching regulator to improve a transient response of the switching regulator, wherein the switching regulator includes at least one power stage circuit, each of the at least one power stage circuit operating according to a corresponding pulse width modulation (PWM) signal; the QR method comprising: performing a differential operation on a voltage sensing signal related to an output voltage, so as to generate a differential signal; comparing the differential signal with a QR threshold signal, to generate the QR signal, wherein when the differential signal exceeds the QR threshold signal, a QR procedure is performed; and in the QR procedure, a PWM signal generation circuit of the switching regulator operably adjusts the PWM signal according to the QR signal, such that a power switch of each power stage circuit is ON or OFF for a QR period according to a QR pulse signal related to the QR signal.

In one embodiment, each of the at least one power stage circuit is configured to operably control the power switch in the corresponding power stage circuit according to the corresponding PWM signal, so as to convert an input voltage to the output voltage.

The objectives, technical details, features, and effects of the present invention is better understood with regard to the

DESCRIPTION OF THE PREFERRED EMBODIMENTS

The drawings as referred to throughout the description of the present invention are for illustration only, to show the interrelations between the circuits and the signal waveforms, but not drawn according to actual scale of circuit sizes and signal amplitudes and frequencies.

Figure 1A:
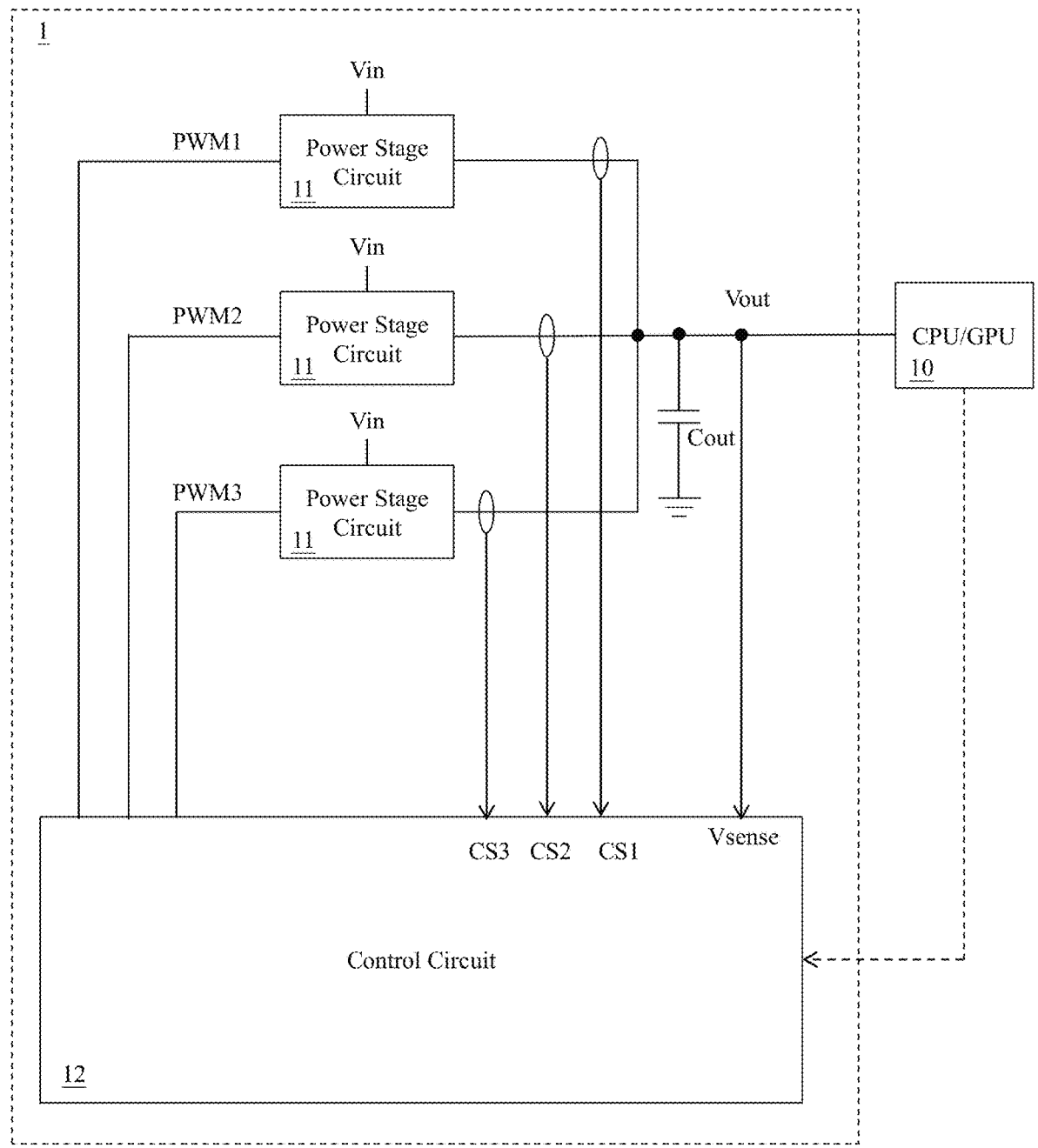
FIG. 1A shows a schematic block diagram of a conventional switching regulator 1.
Figure 1B:
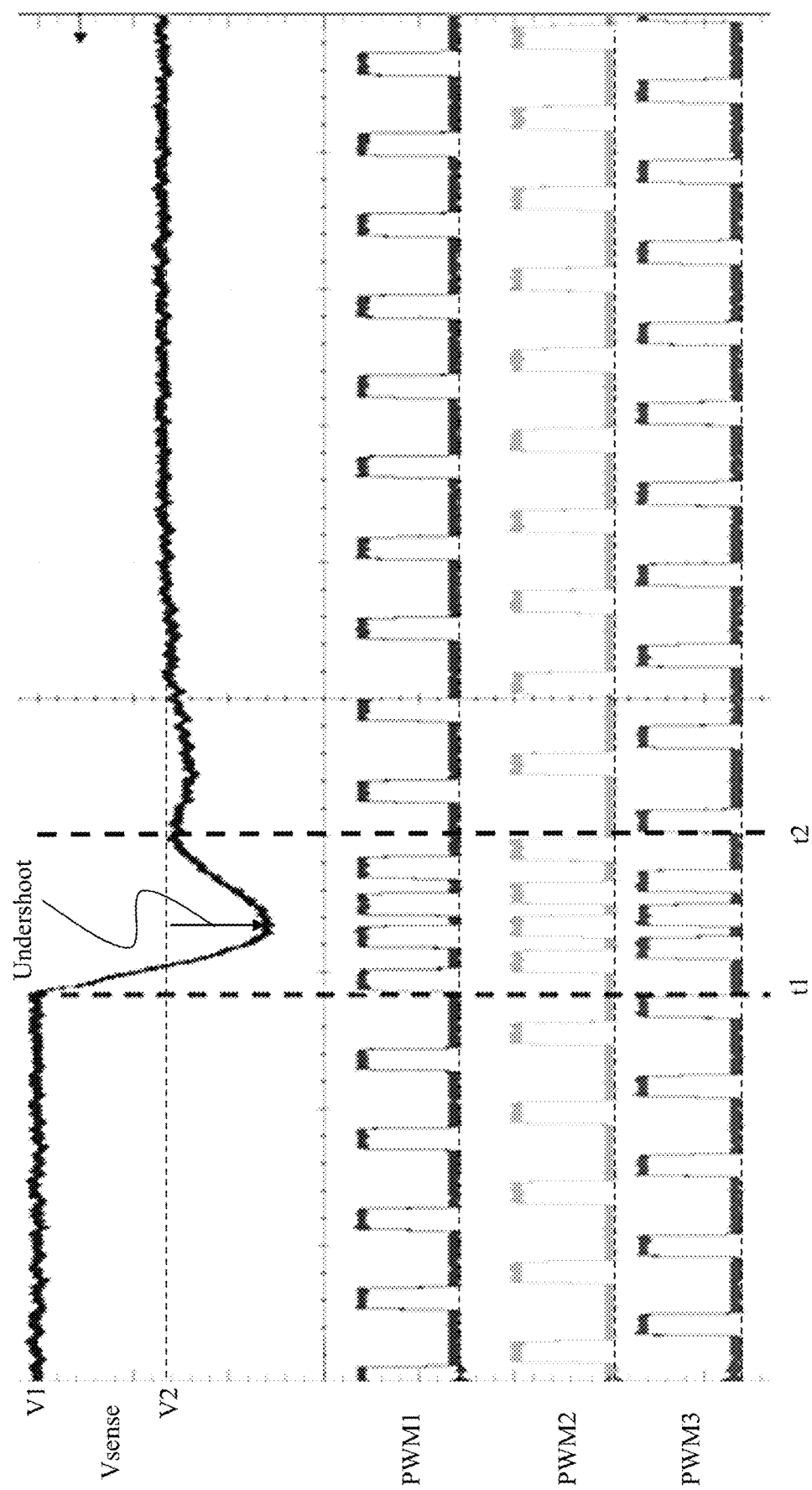
FIG. 1B illustrates waveforms of a voltage sensing signal Vsense and PWM signals PWM1, PWM2 and PWM3 corresponding to a conventional switching regulator 1.
Figure 2:
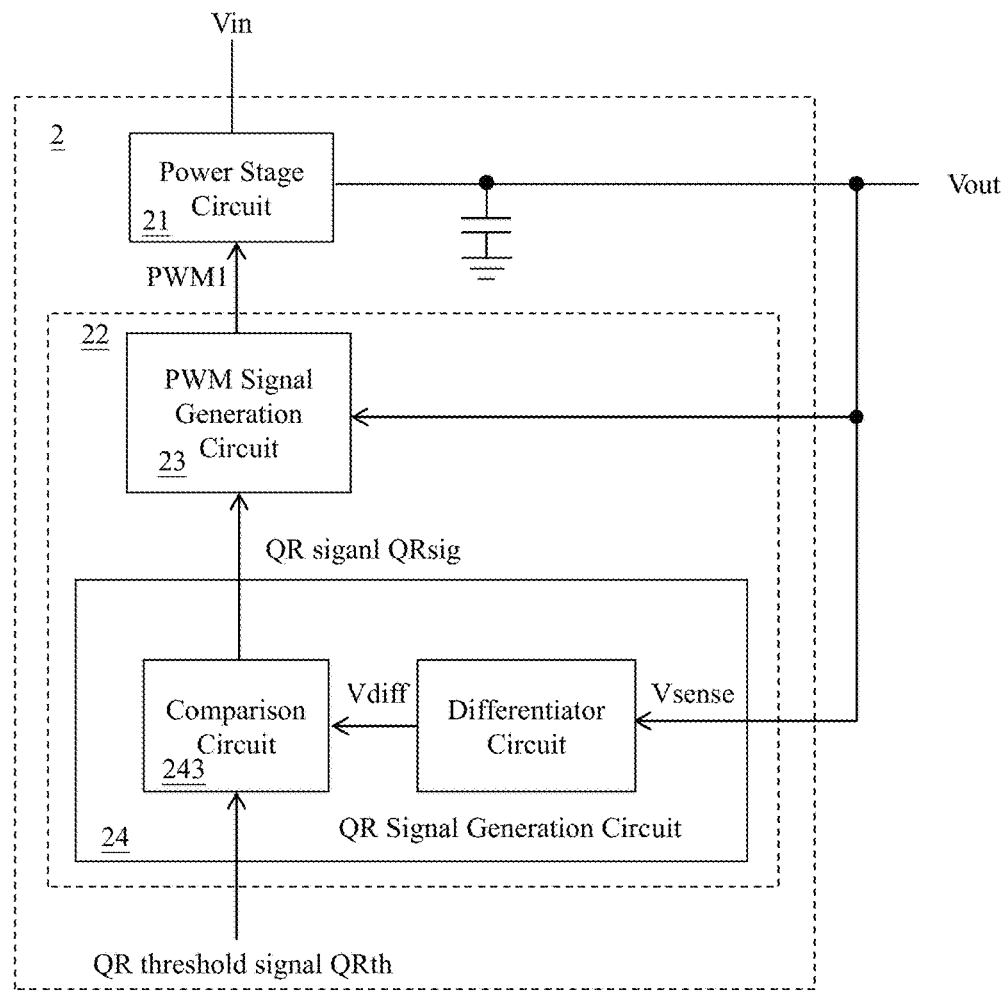
FIG. 2 shows a schematic block diagram of a switching regulator 2 according to an embodiment of the present invention.

Please refer to FIG. 2, which shows a schematic block diagram of a switching regulator (i.e., switching regulator 2) according to an embodiment of the present invention. The switching regulator 2 comprises: a power stage circuits 21 and a control circuit 22. The power stage circuit 21 is configured to operably control a power switch (not shown in FIG. 2, referring to FIGS. 10A-10J) in the power stage circuit 21 according to a pulse width modulation (PWM) signal PWM1, so as to convert an input voltage Vin to an output voltage Vout. The control circuit 22 comprises: a PWM signal generation circuit 23 and a quick response (QR) signal generation circuit 24. The PWM signal generation circuit 23 is coupled to the power stage circuit 21 and is configured to operably generate the PWM signal PWM1 according to the output voltage Vout and a QR signal QRsig. The QR signal generation circuit 24 is coupled to the PWM signal generation circuit 23 and is configured to operably generate the QR signal QRsig according to the output voltage Vout. The QR signal generation circuit 24 includes: a differentiator circuit 241 and a comparison circuit 243. The differentiator circuit 241 is configured to operably perform a differential operation on a voltage sensing signal Vsense related to the output voltage Vout (in particular, to operably perform a differential operation wherein derivative of the voltage sensing signal Vsense over time is computed), so as to generate a differential signal Vdiff. The comparison circuit 243 is coupled to the differentiator circuit 241 and is configured to operably compare the differential signal Vdiff with a QR threshold signal QRth, to generate the QR signal QRsig. When the differential signal Vdiff exceeds the QR threshold signal QRth, the PWM signal generation circuit 23 performs a QR procedure.

Figure 3:
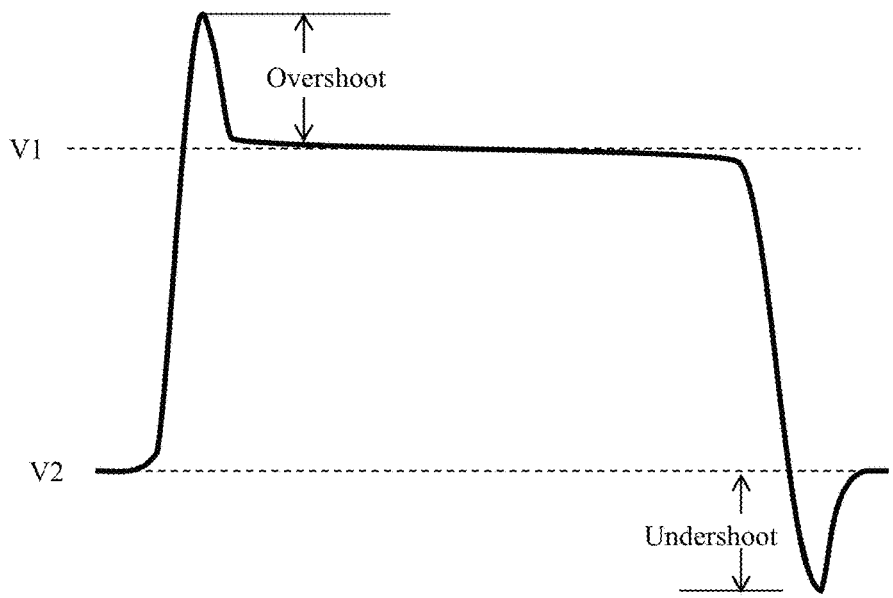
FIG. 3 illustrates waveforms of overshoot and undershoot.

According to the present invention, the power stage circuit 21 can be implemented as a synchronous or an asynchronous buck, boost, inverting, buck-boost or inverting-boost power stage circuit, as shown in FIGS. 10A-10J. It should be understood that the implementation of the power stage circuit 21 as one single power stage circuit 21 in the above-mentioned embodiment is only one possible embodiment of the present invention. In other embodiments, it is also practicable and within the scope of the present invention that the number of the power stage circuit 21 can be plural, which will be explained in detail later. Also please note that the term "QR procedure", as may be used herein, refers to a response procedure to deal with the undershoot and overshoot generated as a result from load transient as the switching regulator 2 is operating in a voltage-droop mode. As described above, at a beginning stage when the output voltage Vout drops from a high voltage level to a low voltage level, voltage undershoot often occurs. On the other hand, at a beginning stage when the output voltage Vout is elevated up from a low voltage level to a high voltage level, a voltage overshoot often occurs. FIG. 3 illustrates waveforms of a typical overshoot and a typical undershoot. In FIG. 3, V1 denotes a high voltage level, and V2 denotes a low voltage level.

Figure 4:
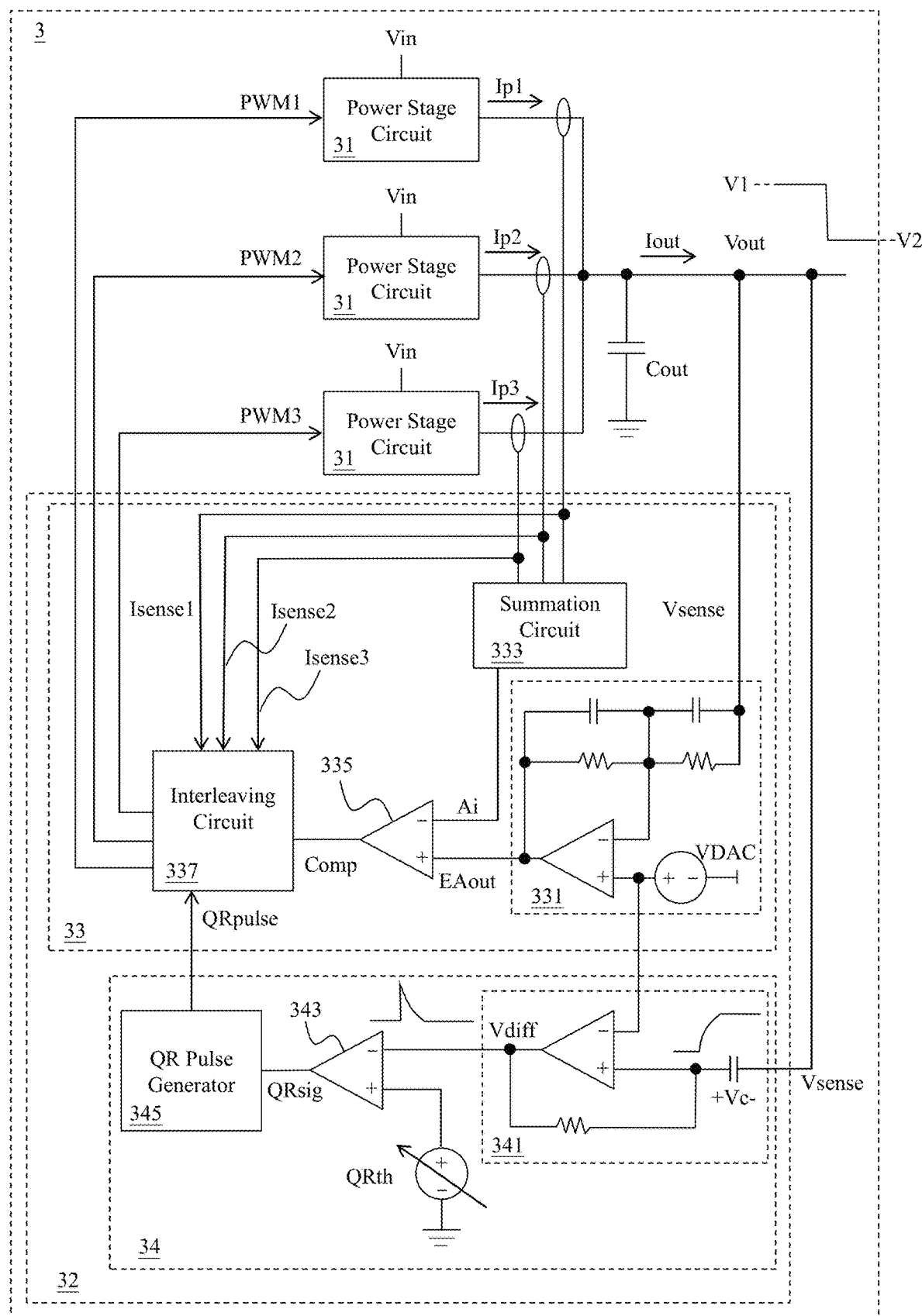
FIG. 4 shows a schematic diagram of a switching regulator 3 according to a specific embodiment of the present invention.

Please refer to FIG. 4, which shows a schematic diagram of a switching regulator 3 according to a specific embodiment of the present invention. As shown in FIG. 4, the switching regulator 3 comprises: plural power stage circuits 31 and a control circuit 32. Each power stage circuit 31 is configured to operably control a power switch or power switches (e.g., the upper gate power switch UG and the lower gate power switch LG in FIGS. 10A-10J) therein according to a corresponding one of the PWM signals PWM1, PWM2 and PWM3, so as to convert an input voltage Vin to an output voltage Vout. The control circuit 32 comprises: a PWM signal generation circuit 33 and a QR signal generation circuit 34. The PWM signal generation circuit 33 is coupled to the power stage circuits 31 and is configured to operably generate the PWM signals PWM1, PWM2 and PWM3 according to the output voltage Vout and a QR signal QRsig. The QR signal generation circuit 34 is coupled to the PWM signal generation circuit 33 and is configured to operably generate the QR signal QRsig according to the output voltage Vout.

The QR signal generation circuit 34 includes: a differentiator circuit 341, a comparison circuit 343 and a QR pulse generator 345. The differentiator circuit 341 is configured to operably perform a differential operation on a voltage sensing signal Vsense related to the output voltage Vout, so as to generate a differential signal Vdiff. The comparison circuit 343 is coupled to the differentiator circuit 341 and is configured to operably compare the differential signal Vdiff with a QR threshold signal QRth, to generate the QR signal QRsig. When the differential signal Vdiff exceeds the QR threshold signal QRth, the PWM signal generation circuit 33 performs a QR procedure. In comparison to the embodiment shown in FIG. 2, the QR signal generation circuit 34 of this embodiment further includes a QR pulse generator 345. In this embodiment, the QR pulse generator 345 is coupled to the comparison circuit 343 and is configured to operably generate a QR pulse signal QRpulse according to the QR signal QRsig.

The switching regulator 3 is a multi-phase switching regulator, which comprises plural power stage circuits 31. During the QR procedure, the PWM signal generation circuit 33 of the switching regulator 3 operably adjusts the PWM signals PWM1, PWM2 and PWM3 according to the QR signal QRsig, such that the corresponding power switch of each power stage circuit 31 is ON or OFF concurrently for a QR period according to the QR pulse signal QRpulse related to the QR signal QRsig.

As shown in FIG. 4, the PWM signal generation circuit 33 includes: an amplifier circuit 331, a summation circuit 333, a comparison circuit 335 and an interleaving circuit 337. The amplifier circuit 331 is configured to operably generate an amplified output signal EAout according to the voltage sensing signal Vsense related to the output voltage Vout and a requested level VDAC which is related to a voltage identification signal. The summation circuit 333 is configured to operably generate a summated current signal Ai according to the phase current Ip1, Ip2 and Ip3 generated from the power stage circuits 31. The comparison circuit 335 is configured to operably compare the amplified output signal EAout with the summated current signal Ai, so as to generate a comparison signal Comp. The interleaving circuit 337 is configured to operably generate the PWM signals PWM1, PWM2 and PWM3 according to the comparison signal Comp, the QR pulse signal QRpulse related to the QR signal QRsig and current sensing signals Isense1, Isense2 and Isense3 related to the phase currents Ip1, Ip2 and Ip3, respectively.

For example, in one embodiment, the switching regulator 3 operates under a constant ON time mode while also operates in a voltage-droop mode as well as an interleaving mode (i.e., during normal operation, power switches in different phases are not turned ON at the same timing). The PWM signal generation circuit 33 is configured to operably generate the PWM signals PWM1, PWM2 and PWM3 according to a voltage identification (VID) signal, so as to regulate the output voltage Vout according to the following equation:

$$V out = VDAC - I out * RLL$$

wherein Vout denotes the output voltage Vout, VDAC denotes a requested level VDAC which is related to the voltage identification signal, Iout denotes an output current Iout and RLL denotes a resistance of a load line. The switching regulator 3 operates under a voltage-droop mode, wherein the PWM signal generation circuit 33 is configured to operably generate the PWM signals PWM1, PWM2 and PWM3 according to the output voltage Vout and the QR signal QRsig via a feedback loop, so as to convert the input voltage Vin to the output voltage Vout.

It is noteworthy that, as one of average skill in the art readily understands, the term "constant ON time", as may be used herein, refers to: during each switching period of a PWM signal, the ON time of a power switch is constant due to the feedback mechanism of the output voltage Vout (rather than due to a QR procedure). Such "constant ON time mode" is well known to those skilled in the art, so the details thereof are not redundantly explained here.

Further, as one of average skill in the art will readily understands, the term "interleaving mode", refers to: when the switching regulator comprises plural power stage circuits, the power switches in these power stage circuits can be controlled to be turned ON in turn via the corresponding PWM signals, such that the output power loading is shared among the power stage circuits, to better meet the demand for a load circuit and to reduce the ripples in the input voltage Vin and the output voltage Vout, whereby the requirements for the size of the inductors in these power stage circuits and the capacitance of the output capacitor Cout can be reduced. (However, in the present invention, besides being capable of operating in the interleaving mode, the multi-phase switching regulator also can perform a QR procedure wherein multiple phases are ON concurrently.)

Under operation during such modes, the differentiator circuit 341 in the QR signal generation circuit 34 performs a differential operation on the voltage sensing signal Vsense related to the output voltage Vout. The voltage sensing signal Vsense can be, for example but not limited to, the output voltage Vout itself or a signal converted from the output voltage Vout. In the shown example, when the output voltage Vout drops from the voltage level V1 to the voltage level V2 (as shown by a small waveform diagram at the upper right part of FIG. 4, nearby the reference mark Vout), the capacitor voltage Vc will be as shown by a small waveform diagram at the lower right part of FIG. 4, nearby the reference mark +Vc−. After the differential operation by the differentiator circuit 341, the generated differential signal Vdiff will be as shown by a small waveform diagram at the lower middle part of FIG. 4, nearby the reference mark Vdiff.

The comparison circuit 343 is configured to operably compare the differential signal Vdiff with a QR threshold signal QRth, to generate the QR signal QRsig. The QR pulse generator 345 is configured to operably generate the QR pulse signal QRpulse according to the QR signal QRsig. In one embodiment, when the switching regulator 3 operates under a voltage-droop mode, under a situation when the output voltage Vout drops from a relatively higher voltage level (e.g., voltage level V1) to a relatively lower voltage level (e.g., voltage level V2) and the differential signal Vdiff exceeds the QR threshold signal QRth, the PWM signal generation circuit 33 operably adjusts the PWM signals PWM1, PWM2 and PWM3 according to the QR signal QRsig, such that the upper gate power switches (e.g., referring to the upper gate power switches UG in FIGS. 10A-10J) of the power stage circuits 31 are ON concurrently for a QR period according to the QR pulse signal QRpulse related to the QR signal QRsig.

In another embodiment, when the switching regulator 3 operates under a voltage-droop mode, under a situation when the output voltage Vout is elevated up from a relatively lower voltage level (e.g., voltage level V2) to a relatively higher voltage level (e.g., voltage level V1) and the differential signal Vdiff exceeds the QR threshold signal QRth, the PWM signal generation circuit 33 operably adjusts the PWM signals PWM1, PWM2 and PWM3 according to the QR signal QRsig, such that the lower gate power switches (e.g., referring to the lower gate power switches LG in FIGS. 10A-10J) of the power stage circuits 31 are ON concurrently for a QR period according to the QR pulse signal QRpulse related to the QR signal QRsig, or such that the upper gate power switches and corresponding lower gate power switches (e.g., referring to the upper gate power switches UG and lower gate power switches LG in FIGS. 10A-10J) of the power stage circuits 31 are OFF concurrently for a QR period according to the QR pulse signal QRpulse related to the QR signal QRsig. In the embodiment wherein the upper gate power switch and the lower gate power switch (e.g., referring to the upper gate power switches UG and lower gate power switches LG in FIGS. 10A-10J) of the power stage circuits 31 are OFF concurrently for a QR period according to the QR pulse signal QRpulse related to the QR signal QRsig, by taking advantage of the tri-state mechanism of the transistor switch, the parasitic diode of the lower gate power switch is turned ON, which can more effectively mitigate the overshoot of the output voltage Vout.

One feature of the present invention which is different from and is advantageous over the prior art is that: the present invention performs a differential operation on the voltage sensing signal Vsense related to the output voltage Vout, to compute arising slope or a falling slope of the output voltage Vout, and the present invention determines whether to cause the power switches of the power stage circuits 31 to be concurrently ON according to the computed results, so as to be able to respond to load transient instantaneously, thus mitigating the unwanted overshoot or undershoot of the output voltage Vout.

According to the present invention, the pulse width of the QR pulse signal QRpulse can be determined via for example two approaches, and the length of the QR period can be determined according to the pulse width of the QR pulse signal QRpulse. In one embodiment, the pulse width of the QR pulse signal QRpulse can a constant pulse width. That is, a QR pulse signal QRpulse having a constant pulse width is generated as long as the differential signal Vdiff exceeds the QR threshold signal QRth, regardless of how long the differential signal Vdiff exceeds the QR threshold signal QRth. In another embodiment, the pulse width of the QR pulse signal QRpulse is adaptively adjusted according to the length of the lasting duration in which the differential signal Vdiff exceeds the QR threshold signal QRth. That is, when the differential signal Vdiff exceeds the QR threshold signal QRth, the pulse width of the QR pulse signal QRpulse is determined according to the length of the lasting duration in which the differential signal Vdiff exceeds the QR threshold signal QRth.

It is noteworthy that, in one embodiment, the QR threshold signal QRth is determined according to an inductor current ripple signal, the capacitance of an output capacitor Cout and/or a phase number of the power stage circuits 31. As one of average skill in the art readily understands, the inductor current is a current flowing through an inductor of the power stage circuit 31, which has ripples, and the inductor current ripple signal is a signal expressing the ripple of the inductor current; for example, the characteristics of the inductor current ripple signal that can be regarded as important references include the rising slope or falling slope of the inductor current ripple signal, which are correlated with, at least, the input voltage Vin, the output voltage Vout, and the inductance of the inductor.

It is noteworthy that, in one embodiment, the QR threshold signal QRth includes a positive QR threshold and/or a negative QR threshold. That is, the QR threshold signal QRth can include a positive QR threshold, a negative QR threshold, or both, to respond to undershoot, overshoot, or both, of the output voltage Vout.

Figure 5:
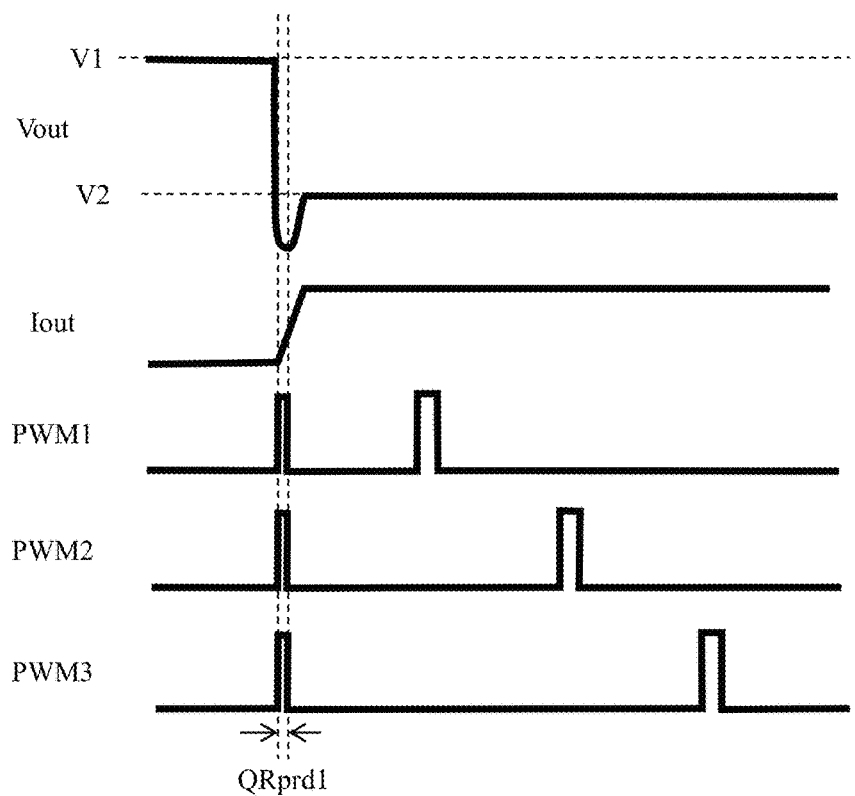
FIG. 5 illustrates waveforms of relevant signals in the case that a quick response (QR) period is relatively short.

Please refer to FIG. 5, which illustrates waveforms of relevant signals in the case that the quick response (QR) period QRprd1 is relatively short. In one embodiment, for example, when the output voltage Vout drops from a relatively higher voltage level (e.g., voltage level V1) to a relatively lower voltage level (e.g., voltage level V2) and under a situation when the differential signal Vdiff exceeds the QR threshold signal QRth, the PWM signal generation circuit 33 operably adjusts the PWM signals PWM1, PWM2 and PWM3 according to the QR signal QRsig, such that the upper gate power switches (e.g., referring to the upper gate power switch UG in FIGS. 10A-10J) of the power stage circuits 31 are ON concurrently for the QR period QRprd1 according to the QR pulse signal QRpulse related to the QR signal QRsig. Please refer to FIG. 5, which illustrates a situation where the quick response (QR) period QRprd1 is relatively short. Under such circumstance, because the compensation for the voltage undershoot is less than adequate, a small voltage undershoot may still occur in the output voltage Vout.

Figure 6:
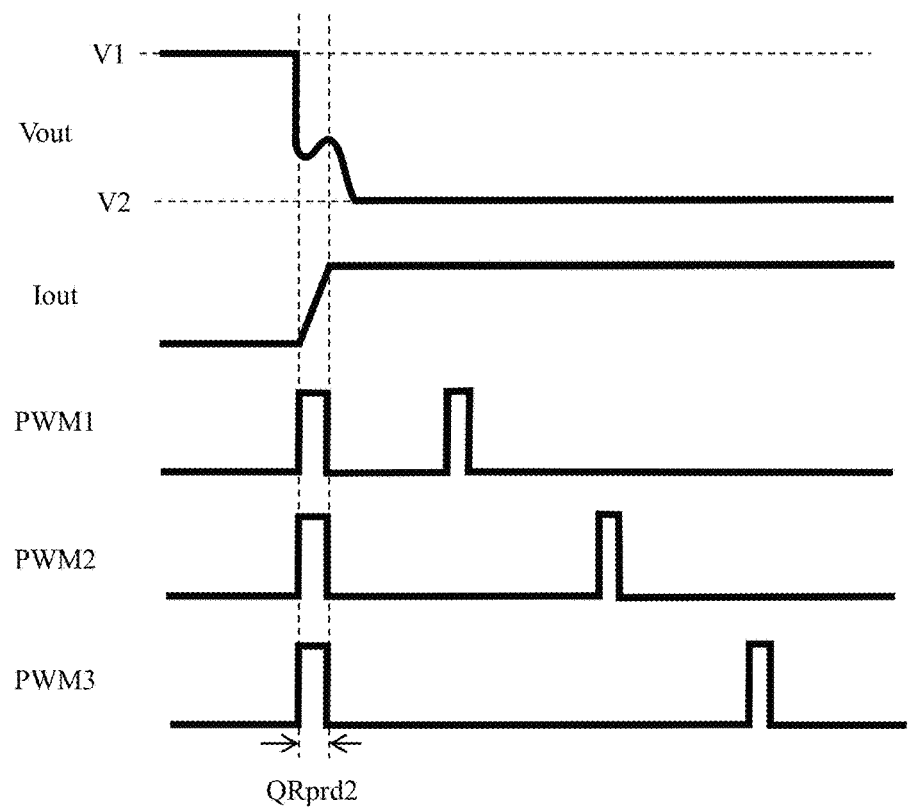
FIG. 6 illustrates waveforms of relevant signals in the case that a QR period is relatively long.

Please refer to FIG. 6, which illustrates waveforms of relevant signals in the case that the quick response (QR) period is relatively long. In one embodiment, for example, when the output voltage Vout drops from a relatively higher voltage level (e.g., voltage level V1) to a relatively lower voltage level (e.g., voltage level V2) and under a situation when the differential signal Vdiff exceeds the QR threshold signal QRth, the PWM signal generation circuit 33 operably adjusts the PWM signals PWM1, PWM2 and PWM3 according to the QR signal QRsig, such that the upper gate power switches (e.g., referring to the upper gate power switch UG in FIGS. 10A-10J) of the power stage circuits 31 are ON concurrently for the QR period QRprd2 according to the QRpulse signal QRpulse related to the QR signal QRsig. Please refer to FIG. 6, which illustrates a situation where the QR period QRprd2 is relatively long. Under such circumstance, because the voltage undershoot is over-compensated, a voltage ringback may occur in the output voltage Vout.

Figure 7:
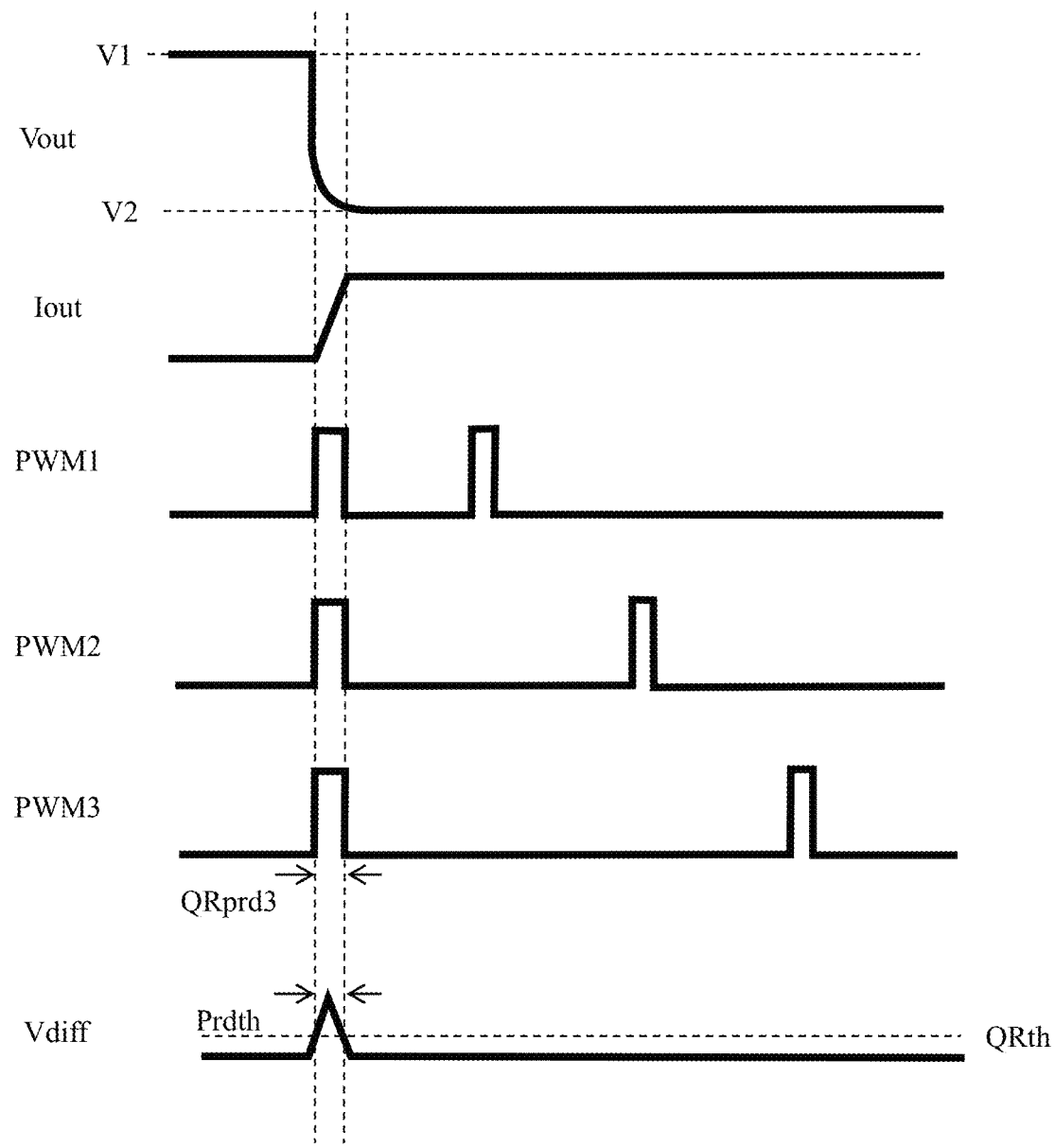
FIG. 7 illustrates waveforms wherein relevant signals are adaptively adjusted according to a duration in which a differential signal exceeds a QR threshold signal in a QR period.

Please refer to FIG. 7, which illustrates waveforms of relevant signals in the case that the ON time of the upper gate power switches in the power stage circuits 31 are adaptively adjusted according to a duration in which the differential signal Vdiff exceeds the QR threshold signal QRth in the QR period QRprd3. In one embodiment, for example, when the output voltage Vout drops from a relatively higher voltage level (e.g., voltage level V1) to a relatively lower voltage level (e.g., voltage level V2) and under a situation when the differential signal Vdiff exceeds the QR threshold signal QRth, the pulse width of the QR pulse signal QRpulse can be determined according to a length of the lasting duration Prdth in which the differential signal Vdiff exceeds the QR threshold signal QRth. Moreover, when the output voltage Vout drops from a relatively higher voltage level (e.g., voltage level V1) to a relatively lower voltage level (e.g., voltage level V2) and under a situation when the differential signal Vdiff exceeds the QR threshold signal QRth, the PWM signal generation circuit 33 operably adjusts the PWM signals PWM1, PWM2 and PWM3 according to the determined pulse width of the QR pulse signal QRpulse, such that the upper gate power switches (e.g., referring to the upper gate power switches UG in FIGS. 10A-10J) of the power stage circuits 31 are ON concurrently for the QR period QRprd3 according to the determined pulse width of the QR pulse signal QRpulse.

Figure 8:
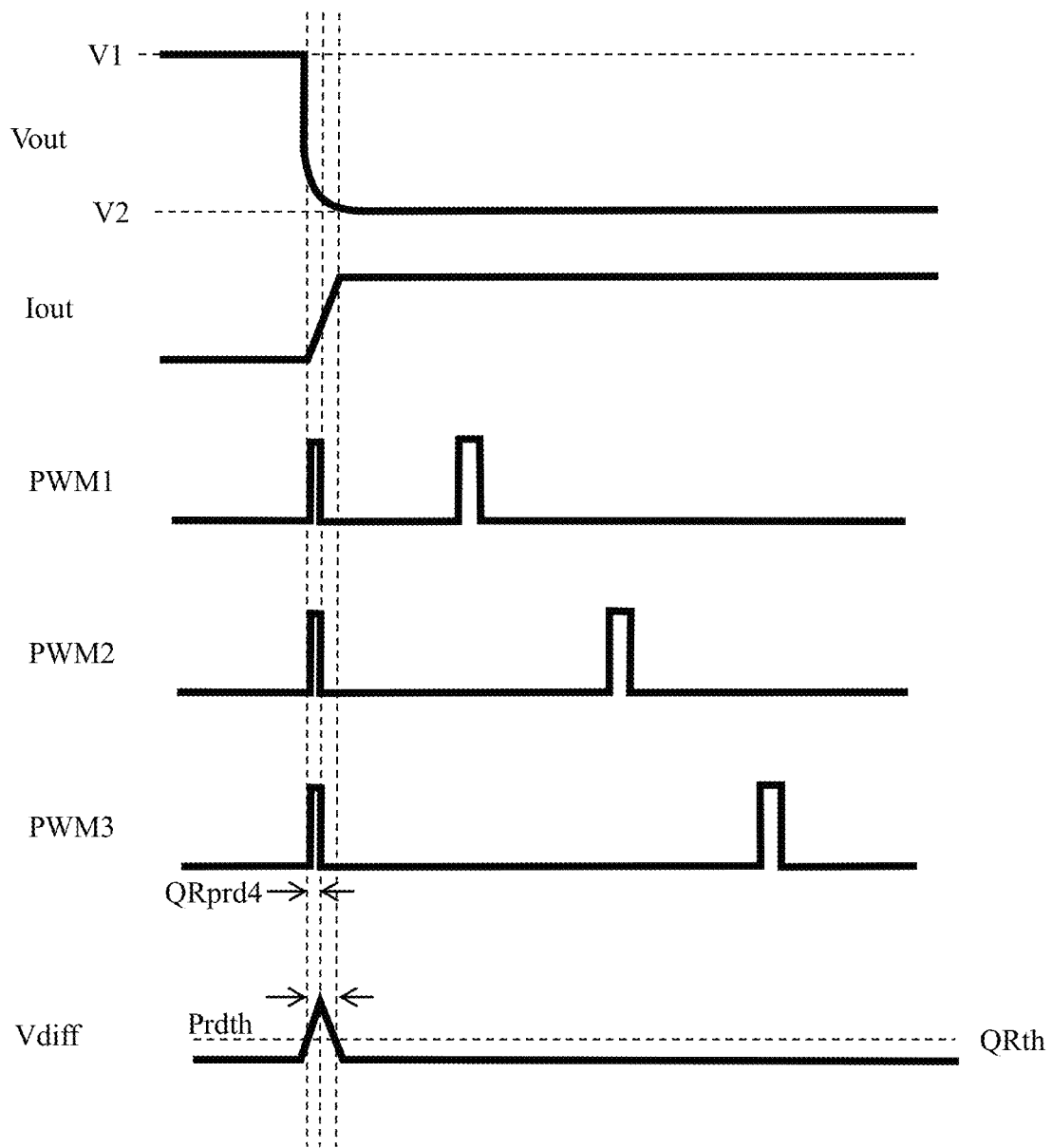
FIG. 8 illustrates waveforms of relevant signals in the case that the QR period has a predetermined constant length.

Please refer to FIG. 8, which illustrates waveforms of relevant signals in the case that the QR period QRprd4 has a predetermined constant length. In one embodiment, for example, when the output voltage Vout drops from a relatively higher voltage level (e.g., voltage level V1) to a relatively lower voltage level (e.g., voltage level V2) and under a situation when the differential signal Vdiff exceeds the QR threshold signal QRth, the pulse width of the QR pulse signal QRpulse can be for example determined not according to a length of the lasting duration Prdth in which the differential signal Vdiff exceeds the QR threshold signal QRth, but instead, the pulse width of the QR pulse signal QRpulse can be a predetermined constant length when the output voltage Vout drops from a relatively higher voltage level (e.g., voltage level V1) to a relatively lower voltage level (e.g., voltage level V2) and under a situation when the differential signal Vdiff exceeds the QR threshold signal QRth. And, the PWM signal generation circuit 33 operably adjusts the PWM signals PWM1, PWM2 and PWM3 of the power stage circuits 31 according to the pulse width of the QR pulse signal QRpulse, such that the upper gate power switches (e.g., referring to the upper gate power switch UG in FIGS. 10A-10J) of the power stage circuits 31 are ON concurrently for the QR period QRprd4 having the predetermined length according to the pulse width of the QR pulse signal QRpulse.

Figure 9:
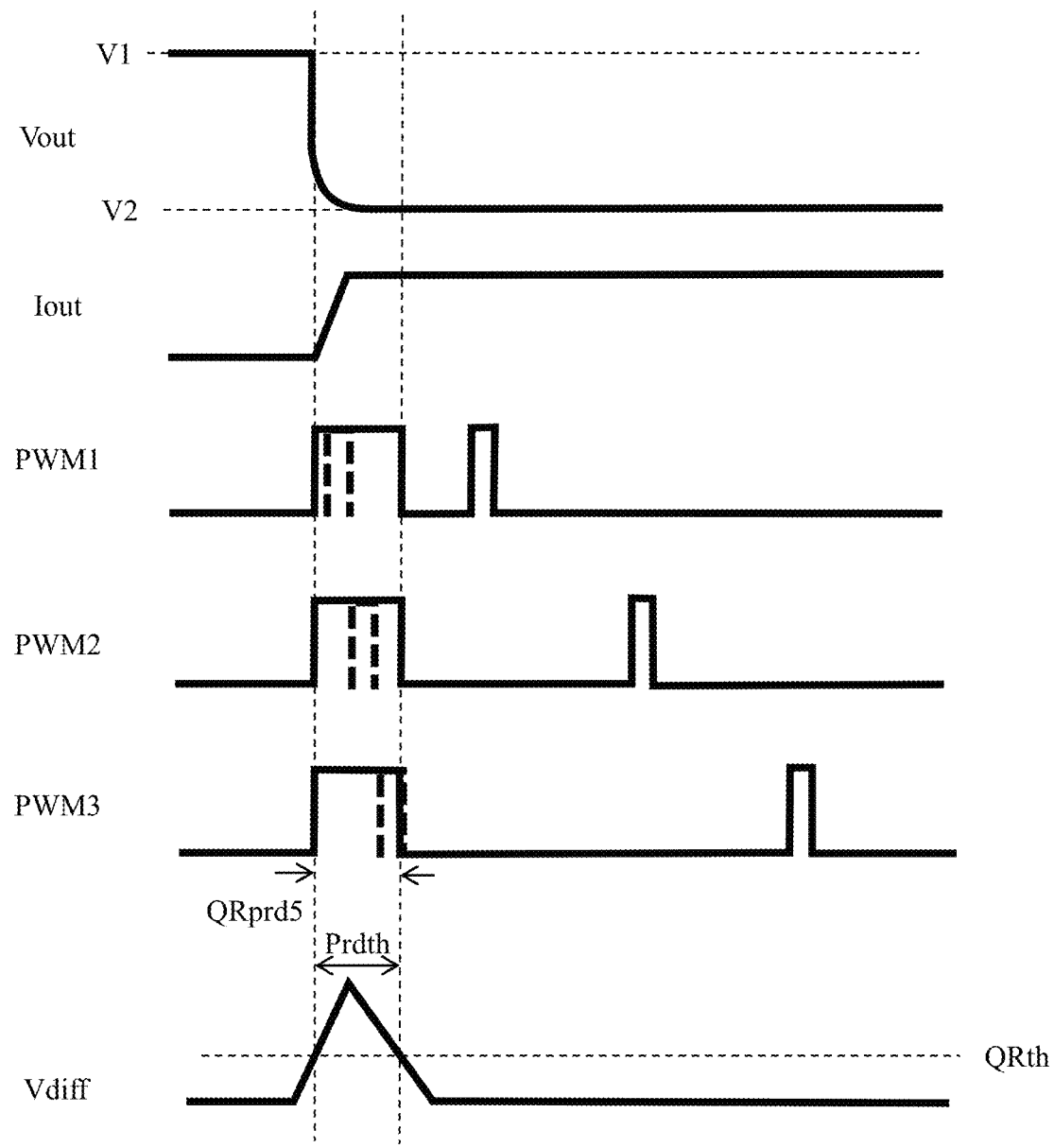
FIG. 9 illustrates waveforms of a situation wherein the QR pulse of the PWM signal overlaps with an interleaving pulse.
Figure 10A:
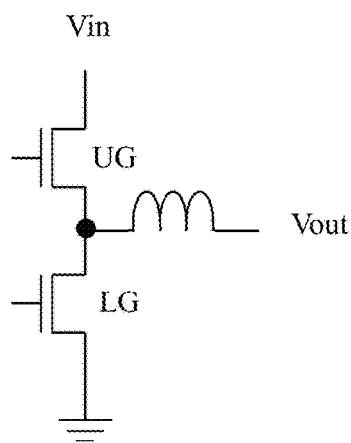
FIGS. 10A-10J show synchronous and asynchronous buck, boost, inverting, buck-boost and inverting-boost power stage circuits, respectively.
Figure 10B:
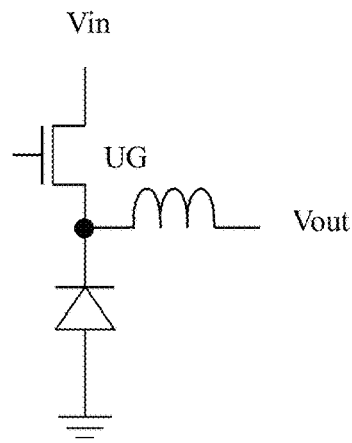
Figure 10C:
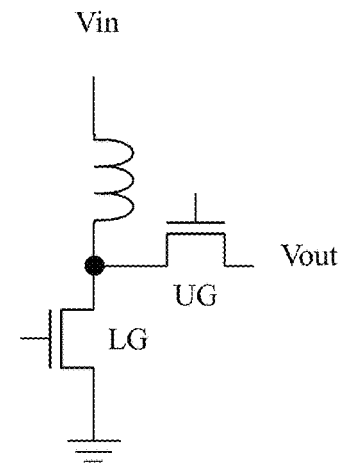
Figure 10D:
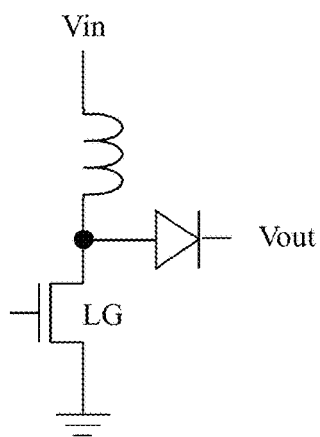
Figure 10E:
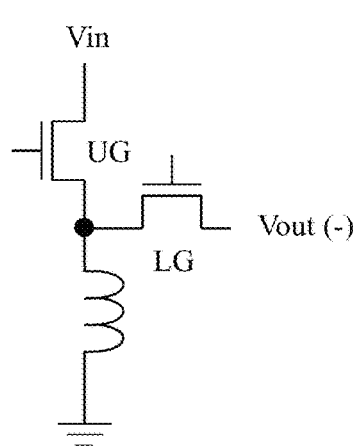
Figure 10F:
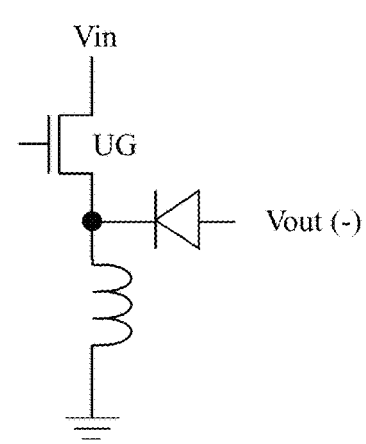
Figure 10G:
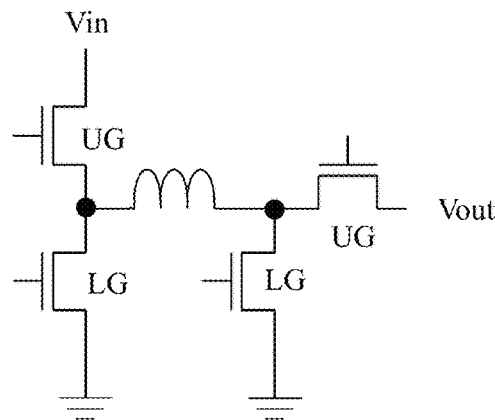
Figure 10H:
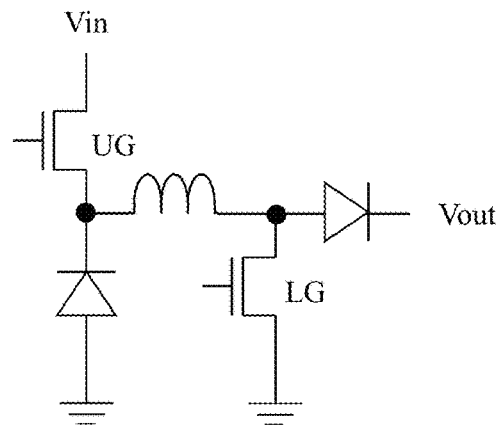
Figure 10J:
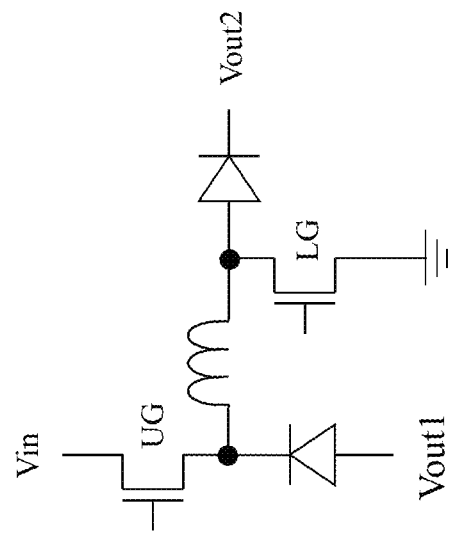
Figure 10I:
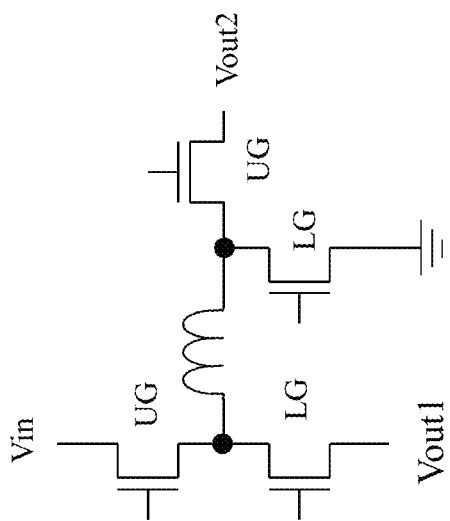

Please refer to FIG. 9, which illustrates waveforms of a situation wherein the QR pulse of the PWM signal overlaps with an interleaving pulse. When the switching regulator operates in a voltage-droop mode and in an interleaving mode, interleaving pulses may be generated in the PWM signals PWM1, PWM2 and PWM3. As shown in FIG. 9, during the QR period QRprd5, QR pulses are generated in the PWM signals PWM1, PWM2 and PWM3 according to the QR pulse signal QRpulse, and the generated QR pulses overlap with the interleaving pulses in PWM signals PWM1, PWM2 and PWM3. In this case, the PWM signals PWM1, PWM2 and PWM3 will remain at high level; in other words, under such situation, the power switches corresponding to PWM signals PWM1, PWM2 and PWM3 are kept ON.

The present invention has been described in considerable detail with reference to certain preferred embodiments thereof. It should be understood that the description is for illustrative purpose, not for limiting the scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. For example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. In view of the foregoing, the spirit of the present invention should cover all such and other modifications and variations, which should be interpreted to fall within the scope of the following claims and their equivalents.

What is claimed is:

1. A switching regulator, comprising:
    at least one power stage circuit, wherein each of the at least one power stage circuit is configured to operably control a power switch in the corresponding power stage circuit according to a pulse width modulation (PWM) signal, so as to convert an input voltage to an output voltage; and
    a control circuit including:
        a PWM signal generation circuit coupled to the at least one power stage circuit, the PWM signal generation circuit being configured to operably generate the PWM signal according to the output voltage and a quick response (QR) signal; and
        a QR signal generation circuit coupled to the PWM signal generation circuit, the QR signal generation circuit being configured to operably generate the QR signal according to the output voltage, wherein the QR signal generation circuit includes:
            a differentiator circuit, which is configured to operably perform a differential operation on a voltage sensing signal related to the output voltage, so as to generate a differential signal; and
            a comparison circuit coupled to the differentiator circuit, the comparison circuit being configured to operably compare the differential signal with a QR threshold signal, to generate the QR signal, wherein when the differential signal exceeds the QR threshold signal, the PWM signal generation circuit performs a QR procedure.

2. The switching regulator of claim 1, wherein the QR signal generation circuit further includes:
    a QR pulse generator coupled to the comparison circuit, the QR pulse generator being configured to operably generate a QR pulse signal according to the QR signal.

3. The switching regulator of claim 1, wherein the switching regulator comprises a plurality of power stage circuits and the PWM signal generation circuit correspondingly generates a plurality of PWM signals, and wherein in the QR procedure, the PWM signal generation circuit operably adjusts the PWM signals according to the QR signal, such that the power switches of the power stage circuits are ON concurrently for a QR period according to a QR pulse signal related to the QR signal.

4. The switching regulator of claim 1, wherein the QR threshold signal is determined according to an inductor current ripple signal, a capacitance of an output capacitor and/or a phase number of the at least one power stage circuit.

5. The switching regulator of claim 1, wherein the switching regulator operates under a constant ON time mode.

6. The switching regulator of claim 1, wherein the QR threshold signal includes: a positive QR threshold and/or a negative QR threshold.

7. The switching regulator of claim 1, wherein when the switching regulator operates under a voltage-droop mode, when the output voltage drops and the differential signal exceeds the QR threshold signal, the PWM signal generation circuit operably adjusts each PWM signal of the corresponding power stage circuit according to the QR signal, such that a corresponding upper gate power switch of each power stage circuit is ON concurrently for a QR period according to a QR pulse signal related to the QR signal.

8. The switching regulator of claim 1, wherein when the switching regulator operates under a voltage-droop mode, when the output voltage increases and the differential signal exceeds the QR threshold signal, the PWM signal generation circuit operably adjusts each PWM signal of the corresponding power stage circuit according to the QR signal, such that a corresponding lower gate power switch of each power stage circuit is ON concurrently for a QR period according to a QR pulse signal related to the QR signal or such that a corresponding upper gate power switch and the corresponding lower gate power switch of each power stage circuit are both OFF concurrently for the QR period according to the QR pulse signal related to the QR signal.

9. The switching regulator of claim 1, wherein the switching regulator operates under a voltage-droop mode, such that the PWM signal generation circuit operably generates the PWM signal according to the output voltage and the QR signal to convert the input voltage to the output voltage via a feedback loop.

10. The switching regulator of claim 9, wherein the PWM signal generation circuit is configured to operably generate the PWM signal further according to a voltage identification signal, so as to regulate the output voltage according to the following equation:

$$V\text{out}=\text{VDAC}-I\text{out}*\text{RLL}$$

wherein Vout denotes the output voltage, VDAC denotes a requested level which is related to the voltage identification signal, Iout denotes an output current and RLL denotes a resistance of a load line.

11. A control circuit for use in a switching regulator, wherein the control circuit is configured to operably convert an input voltage to an output voltage; the control circuit comprising:
   a PWM signal generation circuit coupled to at least one power stage circuit, the PWM signal generation circuit being configured to operably generate a PWM signal according to the output voltage and a quick response (QR) signal; and
   a QR signal generation circuit coupled to the PWM signal generation circuit, the QR signal generation circuit being configured to operably generate the QR signal according to the output voltage, wherein the QR signal generation circuit includes:
      a differentiator circuit, which is configured to operably perform a differential operation on a voltage sensing signal related to the output voltage, so as to generate a differential signal; and
      a comparison circuit coupled to the differentiator circuit, the comparison circuit being configured to operably compare the differential signal with a QR threshold signal, to generate the QR signal, wherein when the differential signal exceeds the QR threshold signal, the PWM signal generation circuit performs a QR procedure.

12. The control circuit of claim 11, wherein the QR signal generation circuit further includes:
   a QR pulse generator coupled to the comparison circuit, the QR pulse generator being configured to operably generate a QR pulse signal according to the QR signal.

13. The control circuit of claim 11, wherein the switching regulator comprises a plurality of power stage circuits and the PWM signal generation circuit correspondingly generates a plurality of PWM signals, and wherein in the QR procedure, the PWM signal generation circuit operably adjusts the PWM signals according to the QR signal, such that the power switches of the power stage circuits are ON concurrently for a QR period according to a QR pulse signal related to the QR signal.

14. The control circuit of claim 11, wherein the QR threshold signal is determined according to an inductor current ripple signal, a capacitance of an output capacitor and/or a phase number of the at least one power stage circuit.

15. The control circuit of claim 11, wherein the switching regulator operates under a constant ON time mode.

16. The control circuit of claim 11, wherein the QR threshold signal includes: a positive QR threshold and/or a negative QR threshold.

17. The control circuit of claim 11, wherein when the switching regulator operates under a voltage-droop mode, when the output voltage drops and the differential signal exceeds the QR threshold signal, the PWM signal generation circuit operably adjusts each PWM signal of the corresponding power stage circuit according to the QR signal, such that a corresponding upper gate power switch of each power stage circuit is ON concurrently for a QR period according to a QR pulse signal related to the QR signal.

18. The control circuit of claim 11, wherein when the switching regulator operates under a voltage-droop mode, when the output voltage increases and the differential signal exceeds the QR threshold signal, the PWM signal generation circuit operably adjusts each PWM signal of the corresponding power stage circuit according to the QR signal, such that a corresponding lower gate power switch of each power stage circuit is ON concurrently for a QR period according to a QR pulse signal related to the QR signal or such that a corresponding upper gate power switch and the corresponding lower gate power switch of each power stage circuit are both OFF concurrently for the QR period according to the QR pulse signal related to the QR signal.

19. The control circuit of claim 11, wherein the switching regulator operates under a voltage-droop mode, such that the PWM signal generation circuit operably generates the PWM signal according to the output voltage and the QR signal to convert the input voltage to the output voltage via a feedback loop.

20. The control circuit of claim 19, wherein the PWM signal generation circuit is configured to operably generate the PWM signal further according to a voltage identification signal, so as to regulate the output voltage according to the following equation:

$$V\text{out}=\text{VDAC}-I\text{out}*\text{RLL}$$

wherein Vout denotes the output voltage, VDAC denotes a requested level which is related to the voltage identification signal, Iout denotes an output current and RLL denotes a resistance of a load line.

21. A quick response (QR) method for use in a switching regulator to improve a transient response of the switching regulator, wherein the switching regulator includes at least one power stage circuit, each of the at least one power stage circuit operating according to a corresponding pulse width modulation (PWM) signal; the QR method comprising:
   performing a differential operation on a voltage sensing signal related to an output voltage, so as to generate a differential signal;
   comparing the differential signal with a QR threshold signal, to generate the QR signal, wherein when the differential signal exceeds the QR threshold signal, a QR procedure is performed; and
   in the QR procedure, a PWM signal generation circuit of the switching regulator operably adjusts the PWM signal according to the QR signal, such that a power switch of each power stage circuit is ON or OFF for a QR period according to a QR pulse signal related to the QR signal.

22. The QR method of claim 21, wherein each of the at least one power stage circuit is configured to operably control the power switch in the corresponding power stage circuit according to the corresponding PWM signal, so as to convert an input voltage to the output voltage.

23. The QR method of claim 21, wherein the switching regulator comprises a plurality of power stage circuits and the PWM signal generation circuit correspondingly generates a plurality of PWM signals, and wherein in the QR procedure, the PWM signal generation circuit operably adjusts the PWM signals according to the QR signal, such that the power switches of the power stage circuits are ON concurrently for a QR period according to a QR pulse signal related to the QR signal.

24. The QR method of claim 21, wherein the QR threshold signal is determined according to an inductor current ripple signal, a capacitance of an output capacitor and/or a phase number of the at least one power stage circuit.

25. The QR method of claim 21, wherein the switching regulator operates under a constant ON time mode.

26. The QR method of claim 21, wherein the QR threshold signal includes: a positive QR threshold and/or a negative QR threshold.

27. The QR method of claim 21, wherein when the switching regulator operates under a voltage-droop mode, when the output voltage drops and the differential signal exceeds the QR threshold signal, the PWM signal generation circuit operably adjusts each PWM signal of the corresponding power stage circuit according to the QR signal, such that a corresponding upper gate power switch of each power stage circuit is ON concurrently for a QR period according to a QR pulse signal related to the QR signal.

28. The QR method of claim 21, wherein when the switching regulator operates under a voltage-droop mode, when the output voltage increases and the differential signal exceeds the QR threshold signal, the PWM signal generation circuit operably adjusts each PWM signal of the corresponding power stage circuit according to the QR signal, such that a corresponding lower gate power switch of each power stage circuit is ON concurrently for a QR period according to a QR pulse signal related to the QR signal or such that a corresponding upper gate power switch and the corresponding lower gate power switch of each power stage circuit are both OFF concurrently for the QR period according to the QR pulse signal related to the QR signal.

29. The QR method of claim 21, wherein the switching regulator operates under a voltage-droop mode, such that the PWM signal generation circuit operably generates the PWM signal according to the output voltage and the QR signal to convert the input voltage to the output voltage via a feedback loop.

30. The QR method of claim 29, wherein the PWM signal generation circuit is configured to operably generate the PWM signal further according to a voltage identification signal, so as to regulate the output voltage according to the following equation:

$$V_{out} = VDAC - I_{out} * RLL$$

wherein Vout denotes the output voltage, VDAC denotes a requested level which is related to the voltage identification signal, Iout denotes an output current and RLL denotes a resistance of a load line.

* * * * *